UNITED STATES PATENT OFFICE.

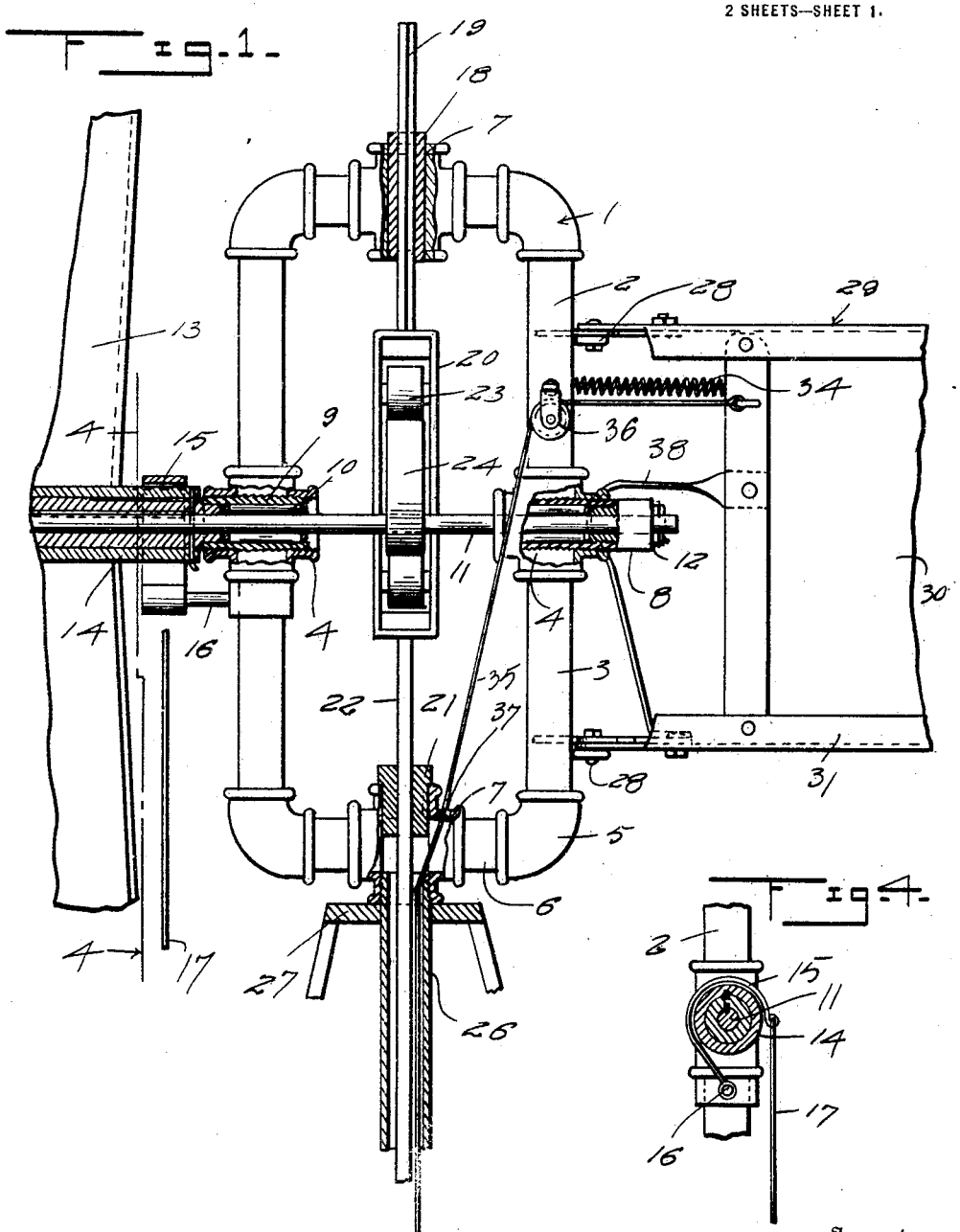

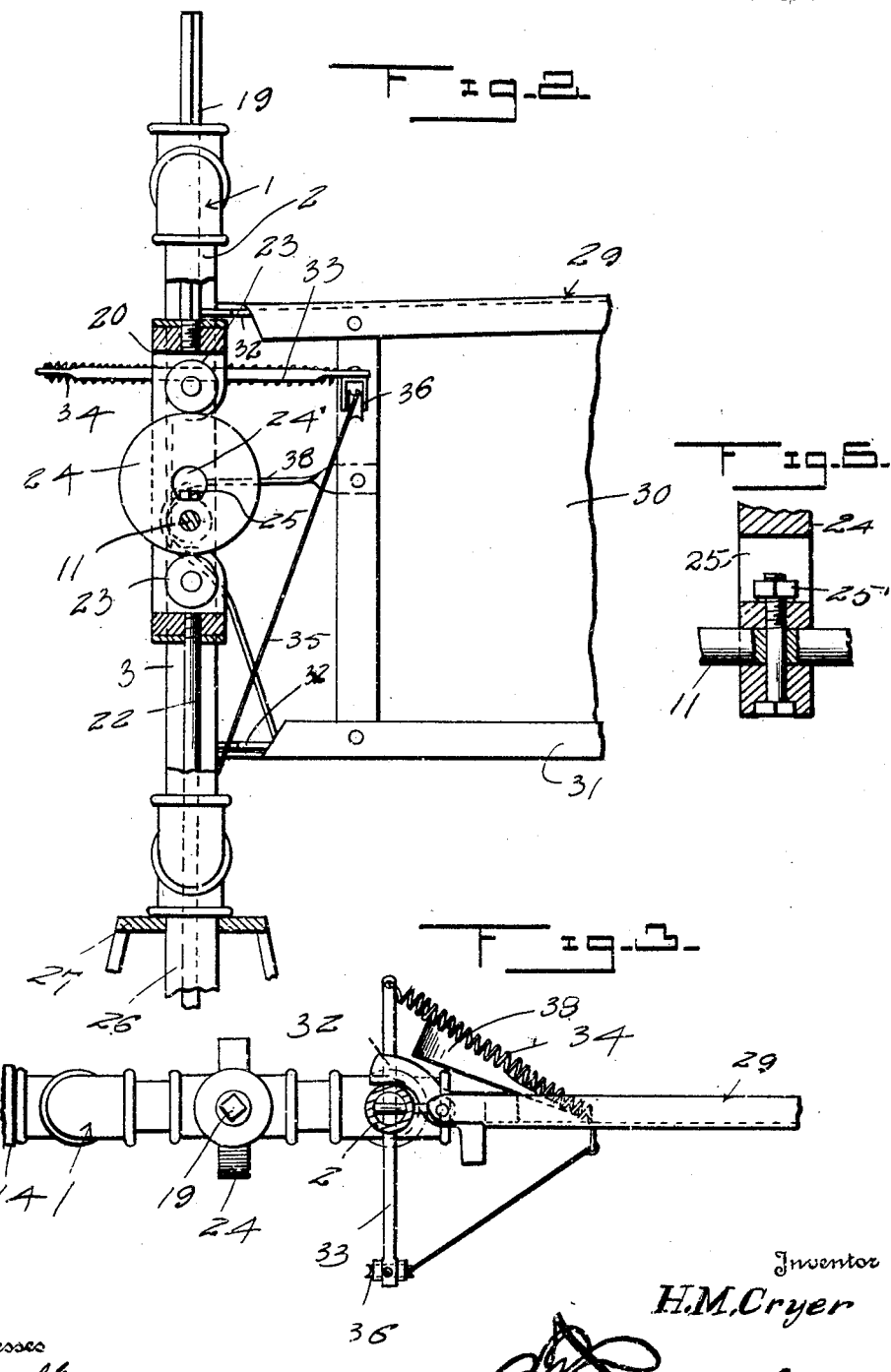

HENRY M. CRYER, OF GOLDTHWAITE, TEXAS.

WINDMILL.

1,368,024.

Specification of Letters Patent.

Patented Feb. 8, 1921.

Application filed May 17, 1917. Serial No. 169,260.

*To all whom it may concern:*

Be it known that I, HENRY M. CRYER, a citizen of the United States, residing at Goldthwaite, in the county of Mills and State of Texas, have invented certain new and useful Improvements in Windmills; and I do hereby declare the following to be a full, clear, and exact description of the invention, such as will enable others skilled in the art to which it appertains to make and use the same.

This invention relates to improvements in a wind mill and has for one of its objects the provision of a device having a novel means of converting a rotating motion into a reciprocatory motion, whereby the usual sucker rod of a pump which is attached to the pitman of the wind mill will be reciprocated.

Another object of this invention is the provision of a frame rotatably mounted upon a supporting structure having a drive shaft with the usual wind wheel secured thereto and which is provided with an eccentric for reciprocating a pitman slidably mounted upon the frame, whereby upon attaching the pitman to the sucker rod of the pump or the like, the same will be reciprocated.

A further object of this invention is the provision of a pair of relatively spaced rollers, operatively connected with the pitman and adapted to engage the periphery of the eccentric for reciprocating the pitman.

A further object of this invention is the provision of a novel form of vane so connected to the frame that it will hold the wind wheel up into the wind so that the wind will drive the same, rotating the drive shaft.

A still further object of this invention is the provision of a wind mill of the above stated character, which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a fragmentary side elevation partly in section of a wind mill constructed in accordance with my invention, Fig. 2 is a rear elevation of the same, Fig. 3 is a top plan view of the wind mill, Fig. 4 is a detail sectional view of the brake for retarding the rotation of the drive shaft, Fig. 5 is a detail sectional view of the means for securing the eccentric to the drive shaft.

Referring in detail to the drawing, the numeral 1 indicates a frame of elongated formation having its sides constructed of upper and lower pipes 2 and 3, which are connected by four-way couplings 4. The upper and lower ends of the pipes 2 and 3 have connected thereto L-couplings 5 to which are connected short pipes 6. The short pipes 6 are connected to four-way couplings 7. The pipes 6 and the four-way couplings 7 form the top and bottom to the frame 1. Pipes 8 and 9 are threaded within the four-way couplings 4 and have mounted therein, roller bearings 10 for rotatably supporting a horizontal drive shaft 11. The horizontal drive shaft 11 has a washer 12 keyed to one end thereof or the end adjacent the pipe 8 and has mounted upon its opposite end, a wind wheel 13 of the ordinary construction employing a hub 14 upon which is mounted or partially surrounds a curved brake band 15. One end of the curved brake band 15 is secured upon a pin 16 carried by one of the four-way couplings 4. A cable 17 is connected to the other end of the brake band 15, whereby upon pulling on the cable, the rotation of the wind-wheel 13 may be retarded as desired.

The upper four-way coupling 7 has mounted therein, a sleeve 18, which is provided with a squared bore to receive a squared guide rod 19. The guide rod 19 has its lower end threaded to the upper end of a frame 20. The lower four-way coupling 7 has mounted therein, a sleeve 21 which slidably receives a pitman 22, which has its upper end threaded to the lower end of the frame 20. The frame 20 has mounted adjacent its upper and lower ends, rollers 23 between which is positioned, an eccentric 24. The eccentric 24 has a central aperture 25 to receive a nut 25′ to be threaded upon a pin after passing through the eccentric and the drive shaft 11, whereby the eccentric 24 is secured to the drive shaft.

A pipe 26 is threaded in the lower end of the lower four-way coupling 7, and is rotatably received by the usual supporting structure 27 of a wind mill. The lower end of the lower four-way coupling 7 bears upon the supporting structure as clearly shown in Fig. 1 so that the frame is free to rotate thereon.

Ears 28 are formed upon the pipes 2 and 3 of the frame 1 upon one side of said frame to which is pivoted a tail vane 29. The tail vane 29 consists of the plate 30 having upper and lower arms 31 secured to its longitudinal edges. The arms 31 are pivotally connected to the ears 28, whereby the vane 29 is free to swing with relation to the frame 1. The arms 31 have formed thereon, extensions 32 which are adapted to engage the frame 1 for limiting the movement of the tail vane in relation to the frame 1 in one direction. A rod 33 is carried by the frame 1 and has secured to one end, thereof, a coiled spring 34, which has its opposite end secured to the tail vane for normally causing the tail vane to move the extensions 32 in engagement with the frame 1. A cable 35 is connected to the vane 29 and passes over a pulley 36, which is swiveled to the rod 33.

The cable 35 after passing over the pulley 36 is passed through an aperture 37 in the lower coupling 7 and thence passes downwardly through the pipe 26 in convenient reach of the ground so that the vane 29 may be pulled or swung upon its pivot to move the wind-wheel up out of the wind for stopping the operation of the device.

A substantially U-shaped member 38 is secured to the vane 29 and is adapted to engage one end of the pipe 8 when the vane is swung at an angle with relation to the frame to limit the movement of said vane in said direction.

In operation, by releasing the cables 17 and 35, the brake will be released and the vane 29 permitted to swing into the wind, which will cause the wind wheel 13 to rotate, driving the shaft 11. As the shaft 11 rotates, the eccentric 24 rotates therewith which moves the pitman 22 upwardly and downwardly, owing to the rollers 23 within the frame 20 traveling about the periphery of the eccentric 24.

While I have shown and described the perferred embodiment of my invention, it will be understood that minor changes in construction, combination and arrangement of parts may be made without departing from the spirit and scope of the invention as claimed.

Having thus described my invention, what I claim is:

A wind mill comprising a vertically disposed elongated frame including side, top and bottom members each including a pair of pipe sections, four-way couplings connecting the adjacent ends of the pipe sections of said side, top and bottom members, means detachably connecting the pipe sections of the side, top and bottom members together, sleeves located in said four-way couplings and one pair of sleeves being disposed vertically to receive a pitman and the other pair of sleeves being disposed horizontally, roller bearings in the horizontally disposed pair of sleeves, a horizontal drive shaft rotatably supported by the roller bearings in the last named sleeves, a wind wheel secured to the shaft, means connecting the shaft to the pitman, a vane pivoted to one of the side members, extensions carried by the pivoted end of the vane and adapted to engage the last named side member for limiting the movement of the vane in one direction, and a stop member carried by the vane and carried to engage one end of one of the four-way couplings to limit the movement of the vane beyond a given distance in a direction opposite to said first named direction.

In testimony whereof I affix my signature in presence of two witnesses.

HENRY M. CRYER.

Witnesses:
WILLIAM CLINE,
W. B. SUMMY.